(12) United States Patent
Tachibana et al.

(10) Patent No.: US 8,826,688 B2
(45) Date of Patent: Sep. 9, 2014

(54) BEVERAGE DISPENSER

(75) Inventors: Yoshihisa Tachibana, Tokyo (JP);
Takashi Nishiyama, Tokyo (JP);
Kazuhide Saito, Osaka (JP); Kazuaki Mizukami, Osaka (JP); Hiroyuki Hashimoto, Osaka (JP); Hiroshi Yamamoto, Osaka (JP)

(73) Assignee: The Coca-Cola Company, Atlanta, GA (US)

( * ) Notice: Subject to any disclaimer, the term of this patent is extended or adjusted under 35 U.S.C. 154(b) by 506 days.

(21) Appl. No.: 12/990,668

(22) PCT Filed: Apr. 22, 2009

(86) PCT No.: PCT/JP2009/001832
§ 371 (c)(1),
(2), (4) Date: Nov. 2, 2010

(87) PCT Pub. No.: WO2009/136473
PCT Pub. Date: Nov. 12, 2009

(65) Prior Publication Data
US 2011/0041543 A1 Feb. 24, 2011

(30) Foreign Application Priority Data

May 9, 2008 (JP) ................................. 2008-123268

(51) Int. Cl.
*F25D 3/00* (2006.01)

(52) U.S. Cl.
USPC ................... 62/389; 62/396; 62/398; 62/399; 62/340; 222/146.6; 222/129.1; 222/55; 222/61; 222/399; 222/396; 222/394; 137/599.09; 261/DIG. 7

(58) Field of Classification Search
CPC ..... F25B 40/02; F25B 31/002; B67D 1/0068; B67D 1/12; B67D 1/0418; B67D 1/0861; B67D 1/0865; B67D 1/0867; A23G 9/045

USPC ................ 62/396, 398, 399, 340; 222/146.6, 222/129.1, 55, 61, 399, 396, 394; 137/599.09; 261/DIG. 7

See application file for complete search history.

(56) References Cited

U.S. PATENT DOCUMENTS 3,369,717 A * 2/1968 Campbell ...................... 222/399
4,187,262 A * 2/1980 Fessler et al. ................ 261/50.3

(Continued)

FOREIGN PATENT DOCUMENTS

JP 2001-325656 * 11/2001

OTHER PUBLICATIONS

International Search Report and Written Opinion from the Japanese PTO for International Application No. PCT/JP2009/001832.

*Primary Examiner* — Frantz Jules
*Assistant Examiner* — Erik Mendoza-Wilkenfe
(74) *Attorney, Agent, or Firm* — Sutherland Asbill & Brennan LLP

(57) ABSTRACT

To provide a beverage dispenser capable of appropriately and smoothly supplying a supercooled beverage. According to the present invention, there is disclosed a beverage dispenser including a beverage supply circuit 7 which supplies a carbonated beverage to the outside a primary cooling device 13, a secondary cooling device 30, and a heat exchanger 16 for supercooling which allows these components to cool the carbonated beverage flowing through the beverage supply circuit 7 into a supercooled state at a temperature of a solidifying point or less. The heat exchanger 16 supplies the carbonated beverage in the supercooled state to release the supercooled state in the outside, and the carbonated beverage on standby for serving in a portion of the beverage supply circuit 7 cooled by at least the heat exchanger 16 for supercooling is maintained in an unsaturated state.

11 Claims, 7 Drawing Sheets

(56) References Cited

U.S. PATENT DOCUMENTS

| | | | |
|---|---|---|---|
| 5,002,201 A * | 3/1991 | Hancock et al. | 222/61 |
| 5,124,088 A * | 6/1992 | Stumphauzer | 261/121.1 |
| 5,681,507 A * | 10/1997 | Kazuma | 261/27 |
| 5,706,661 A * | 1/1998 | Frank | 62/70 |
| 5,839,291 A * | 11/1998 | Chang | 62/126 |
| 2006/0157515 A1 * | 7/2006 | Oswald | 222/399 |
| 2007/0068191 A1 * | 3/2007 | Wolski et al. | 62/390 |
| 2008/0011910 A1 * | 1/2008 | Ramsey | 248/100 |
| 2008/0041876 A1 * | 2/2008 | Frank et al. | 222/1 |

* cited by examiner

BEVERAGE DISPENSER

TECHNICAL FIELD

The present invention relates to a beverage dispenser which supplies a carbonated beverage brought into a supercooled state at a solidifying point or less and which releases the supercooled state in the outside to manufacture a sherbet-like carbonated beverage.

BACKGROUND ART

Heretofore, in a beverage dispenser which supplies a beverage to a cup and the like, a syrup supply line is drawn from a tank filled with a syrup as a beverage ingredient, and a diluting water supply line is also provided which dilutes the syrup at a predetermined ratio. In these syrup supply line and diluting water supply line, a syrup cooling coil and a diluting water cooling coil are interposed, respectively. These coils are immersed into a water tank in which cooling water is stored to cool the syrup and the diluting water flowing through the coils to a predetermined temperature. In consequence, the syrup and the diluting water cooled at the predetermined cooling temperature are mixed at nozzles, respectively, and discharged as a targeted beverage to the cup.

The beverage supplied by the above-mentioned constitution is all stored in the cup in a liquid state. Therefore, ice pieces are separately put into the cup to serve the beverage to a customer in a state in which the beverage can be maintained at a constant cooling temperature for a certain degree of time.

However, when the ice pieces are supplied to the cup, the only beverage around the floating ice pieces is cooled owing to heat of fusion. Therefore, it is difficult to uniformly cool the whole beverage in the cup. Moreover, as the ice pieces melt, the concentration of the beverage decreases. It has therefore been difficult to serve the beverage in an appropriately cooled state.

To solve the problem, heretofore, a device has been developed in which the beverage to be served is cooled to a temperature of or below a solidifying point of the beverage to discharge the beverage to the cup as it is in a supercooled state, whereby the beverage is immediately phase-changed to ice owing to impact during the discharging to serve a sherbet-like beverage (see Patent Document 1).

CITATION LIST

Patent Literature

PTL 1: Japanese Patent Application Laid-Open No. 2001-325656

SUMMARY OF INVENTION

Technical Problem

However, when the supercooled carbonated beverage is manufactured using the above-mentioned device, carbonated water having a saturated state is used. In this case, the carbonated water having the saturated state has a quasi stable state in which the water is pressurized so as to maintain the saturated state but bubble is easily generated. Therefore, in a process in which the carbonated beverage having the saturated state is cooled to a temperature of a solidifying point or less of the beverage, the generated bubble forms an ice nucleus, and the beverage phase-changes to ice before the beverage is discharged to the cup. This results in a problem that the beverage cannot be discharged in a stably supercooled state.

The present invention has been developed to solve the conventional technical problem, and an object thereof is to provide a beverage dispenser capable of appropriately and smoothly supplying the carbonated beverage as a supercooled beverage.

Solution to Problem

A beverage dispenser according to the present invention comprises: a beverage supply circuit which supplies a carbonated beverage to the outside; cooling means; and a heat exchanger for supercooling which allows the cooling means to cool the carbonated beverage flowing through the beverage supply circuit into a supercooled state at a temperature of a solidifying point or less, characterized in that the heat exchanger for supercooling supplies the carbonated beverage in the supercooled state to release the supercooled state in the outside, and the carbonated beverage on standby for serving in a portion of the beverage supply circuit cooled by at least the heat exchanger for supercooling is maintained in an unsaturated state.

The beverage dispenser of a second invention is characterized in that in the above invention, the cooling means includes a primary cooling device which cools the carbonated beverage to an ice point or so, and an anti-freezing liquid circuit through which an anti-freezing liquid cooled to the solidifying point or less of the carbonated beverage is circulated, and the heat exchanger for supercooling performs heat exchange between the carbonated beverage flowing through the beverage supply circuit and the anti-freezing liquid flowing through the anti-freezing liquid circuit.

The beverage dispenser of a third invention is characterized in that in the above invention, in the anti-freezing liquid circuit, the anti-freezing liquid having a predetermined cold reserving temperature higher than the solidifying point of the carbonated beverage is circulated through the heat exchanger for supercooling at a time when the carbonated beverage is on standby for serving, and the anti-freezing liquid cooled to the solidifying point or less of the carbonated beverage is circulated through the heat exchanger for supercooling at a time when the carbonated beverage is served.

The beverage dispenser of a fourth invention is characterized in that the above inventions further comprise: a carbonator which manufactures the carbonated beverage from a carbonic acid gas supplied from a carbonic acid gas source which supplies the pressurized carbonic acid gas and beverage ingredients, the carbonator being connected to the beverage supply circuit; and valve devices provided between the carbonator and the portion of the beverage supply circuit cooled by the heat exchanger for supercooling and at the outlet of the beverage supply circuit. The beverage dispenser is characterized in that the supply pressure of the carbonic acid gas source is varied, the carbonic acid gas is supplied from the carbonic acid gas source to the carbonator with a first supply pressure to manufacture the saturated carbonated beverage from the carbonic acid gas and the beverage ingredients in the carbonator, the carbonic acid gas is supplied to the carbonator with a second supply pressure higher than the first supply pressure to push out the carbonated beverage from the carbonator to the beverage supply circuit in a case where the carbonated beverage is served, the pressure of the beverage supply circuit between the valve devices is maintained at the second supply pressure by the valve devices after the carbonated beverage is served, and the pressure in the carbonator is set to the first supply pressure in a state in which the carbonated beverage in the beverage supply circuit is brought into the unsaturated state.

The beverage dispenser of a fifth invention is characterized in that in the above invention, the valve device provided between the carbonator and the portion of the beverage supply circuit cooled by the heat exchanger for supercooling is a check valve.

The beverage dispenser of a sixth invention is characterized in that the fourth or fifth invention further comprises: an exhaust valve which discharges the carbonic acid gas from the carbonator. After the carbonated beverage is served, the exhaust valve is opened to decrease the pressure in the carbonator, and the supply pressure from the carbonic acid gas source is set to the first supply pressure.

The beverage dispenser of a seventh invention is characterized in that in the fourth to sixth inventions, the beverage supply circuit between the carbonator and the heat exchanger for supercooling is cooled to the ice point or so.

Advantageous Effects of Invention

According to the present invention, a beverage dispenser comprises the beverage supply circuit which supplies a carbonated beverage to the outside; cooling means; and a heat exchanger for supercooling which allows the cooling means to cool the carbonated beverage flowing through the beverage supply circuit into a supercooled state at a temperature of a solidifying point or less. The heat exchanger for supercooling supplies the carbonated beverage in the supercooled state to release the supercooled state in the outside, and the carbonated beverage on standby for serving in a portion of the beverage supply circuit cooled by at least the heat exchanger for supercooling is maintained in an unsaturated state. Therefore, it is possible to suppress a disadvantage that bubble is generated in the carbonated beverage in at least the heat exchanger for supercooling to form an ice nucleus in a process in which the carbonated beverage is cooled to the temperature of the solidifying point or less.

In consequence, the carbonated beverage can be cooled into the supercooled state at the solidifying point or less of the beverage with a high probability, and the beverage can immediately be phase-changed to ice owing to impact in a case where the beverage brought into the supercooled state is injected to a cup or the like. The beverage can be served in a sherbet state as a final supply state.

According to the second invention, in addition to the above invention, the cooling means includes a primary cooling device which cools the carbonated beverage to an ice point or so, and an anti-freezing liquid circuit through which an anti-freezing liquid cooled to the solidifying point or less of the carbonated beverage is circulated. The heat exchanger for supercooling performs heat exchange between the carbonated beverage flowing through the beverage supply circuit and the anti-freezing liquid flowing through the anti-freezing liquid circuit. Therefore, the carbonated beverage which has been cooled by the primary cooling device and which has flowed into the beverage supply circuit is subjected to the heat exchange between the carbonated beverage and the anti-freezing liquid cooled to the solidifying point or less of the carbonated beverage in the heat exchanger for supercooling, whereby the carbonated beverage can be cooled into the supercooled state at the solidifying point or less.

In particular, the present invention is constituted so that the anti-freezing liquid flows through the anti-freezing liquid circuit to cool the carbonated beverage flowing through the beverage supply circuit, so that the device can be miniaturized as compared with a case where the beverage is cooled using an anti-freezing liquid tank. Moreover, the anti-freezing liquid is circulated through a limited circuit such as the anti-freezing liquid circuit, so that temperature control can easily be performed. In consequence, even if the supercooled state of the carbonated beverage in the beverage supply circuit subjected to the heat exchange between the beverage and the anti-freezing liquid circuit is released and frozen, the frozen carbonated beverage can easily be melted. The clogging of the beverage supply circuit can be eliminated, and the supercooled beverage can appropriately and smoothly be supplied.

According to the third invention, in addition to the above invention, in the anti-freezing liquid circuit, the anti-freezing liquid having a predetermined cold reserving temperature higher than the solidifying point of the carbonated beverage is circulated through the heat exchanger for supercooling at a time when the carbonated beverage is on standby for serving, and the anti-freezing liquid cooled to the solidifying point or less of the carbonated beverage is circulated through the heat exchanger for supercooling at a time when the carbonated beverage is served. The carbonated beverage does not have to be maintained in the supercooled state for a long time, and the generation probability of the ice nucleus can be decreased to prevent the clogging of the circuit due to the freezing in the portion of the beverage supply circuit constituting the heat exchanger for supercooling.

Moreover, when the carbonated beverage is on standby for serving, the carbonated beverage is maintained at the predetermined cold reserving temperature higher than the solidifying point of the beverage. Therefore, when the beverage is served, the carbonated beverage can efficiently be cooled into the supercooled state.

According to the fourth invention, in addition to the above inventions, the beverage dispenser further comprises: a carbonator which manufactures the carbonated beverage from a carbonic acid gas supplied from a carbonic acid gas source which supplies the pressurized carbonic acid gas and beverage ingredients, the carbonator being connected to the beverage supply circuit; and valve devices provided between the carbonator and the portion of the beverage supply circuit cooled by the heat exchanger for supercooling and at the outlet of the beverage supply circuit. The supply pressure of the carbonic acid gas source is varied, the carbonic acid gas is supplied from the carbonic acid gas source to the carbonator with a first supply pressure to manufacture the saturated carbonated beverage from the carbonic acid gas and the beverage ingredients in the carbonator, the carbonic acid gas is supplied to the carbonator with a second supply pressure higher than the first supply pressure to push out the carbonated beverage from the carbonator to the beverage supply circuit in a case where the carbonated beverage is served, the pressure of the beverage supply circuit between the valve devices is maintained at the second supply pressure by the valve devices after the carbonated beverage is served, and the pressure in the carbonator is set to the first supply pressure in a state in which the carbonated beverage in the beverage supply circuit is brought into the unsaturated state. In consequence, the carbonated beverage in the beverage supply circuit between both the valve devices can be maintained in the unsaturated state in a simple structure.

In consequence, in the beverage supply circuit including the heat exchanger for supercooling, it is possible to suppress the disadvantage that the bubble is generated in the carbonated beverage and that the bubble forms the ice nucleus in the process in which the beverage is cooled to the temperature of the solidifying point or less.

Moreover, the carbonated beverage can efficiently be cooled into the supercooled state at the solidifying point or less of the beverage, and the beverage can immediately be phase-changed to the ice owing to the impact in a case where the beverage brought into the supercooled state is injected to the cup or the like. The beverage can be served in the sherbet state as the final supply state.

According to the fifth invention, in addition to the above invention, the valve device provided between the carbonator and the portion of the beverage supply circuit cooled by the heat exchanger for supercooling is a check valve. Therefore, the check valve and the valve device provided at the outlet of the beverage supply circuit can maintain the pressure in the beverage supply circuit between both the valve devices at the second supply pressure. In consequence, the valve device is the check valve, so that unlike an electromagnetic valve or the like, an electric power is not necessary, and energy saving can be realized. A disadvantage that the beverage is warmed by the electromagnetic valve can be prevented.

In consequence, the carbonated beverage in the heat exchanger for supercooling can appropriately be brought into the unsaturated state in the simple constitution, and a disadvantage that the ice nucleus is generated in the process of cooling the beverage to the solidifying point or less of the beverage can be suppressed.

According to the sixth invention, in addition to the fourth or fifth invention, the beverage dispenser further comprises: an exhaust valve which discharges the carbonic acid gas from the carbonator. After the carbonated beverage is served, the exhaust valve is opened to decrease the pressure in the carbonator, and the supply pressure from the carbonic acid gas source is set to the first supply pressure. In consequence, the exhaust valve is opened, whereby the pressure in the carbonator can easily be adjusted into a pressure corresponding to a defined gas volume value.

According to the seventh invention, in addition to the fourth to sixth inventions, the beverage supply circuit between the carbonator and the heat exchanger for supercooling is cooled to the ice point or so. In consequence, the saturated carbonated beverage formed in the carbonator can be stabilized in a process in which the beverage is discharged from the carbonator to flow into the heat exchanger for supercooling. Therefore, the carbonated beverage in a more stabilized state can be allowed to flow into the heat exchanger for supercooling, and it is possible to more efficiently avoid the disadvantage that the ice nucleus in a process in which the supercooled state is formed.

DESCRIPTION OF EMBODIMENTS

Next, a beverage dispenser 1 as the embodiment of the present invention will be described in detail with reference to the drawings. The beverage dispenser 1 according to the present embodiments is a dispenser for use in a restaurant, a coffee shop or the like, and is a device which supplies a targeted beverage such as a strongly or weakly carbonated drink or a non-carbonated drink in a supercooled state and which serves a sherbet-like beverage in a container such as a cup.

EXAMPLES

Figure 1:
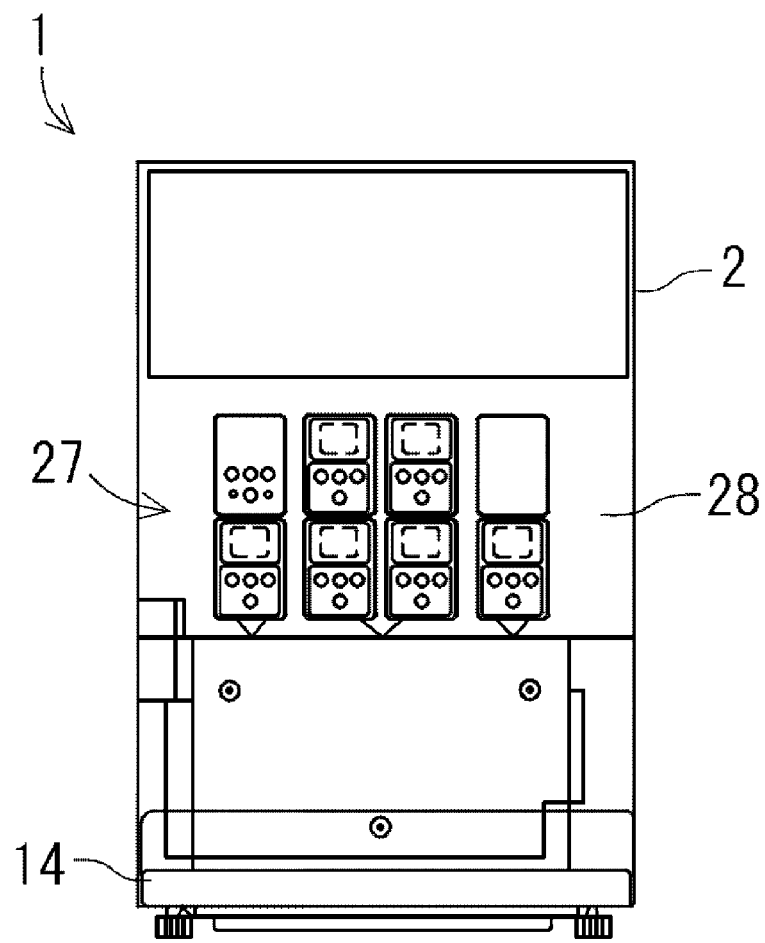
FIG. 1 is a front view of a main body of a beverage dispenser according to the present invention.
Figure 2:
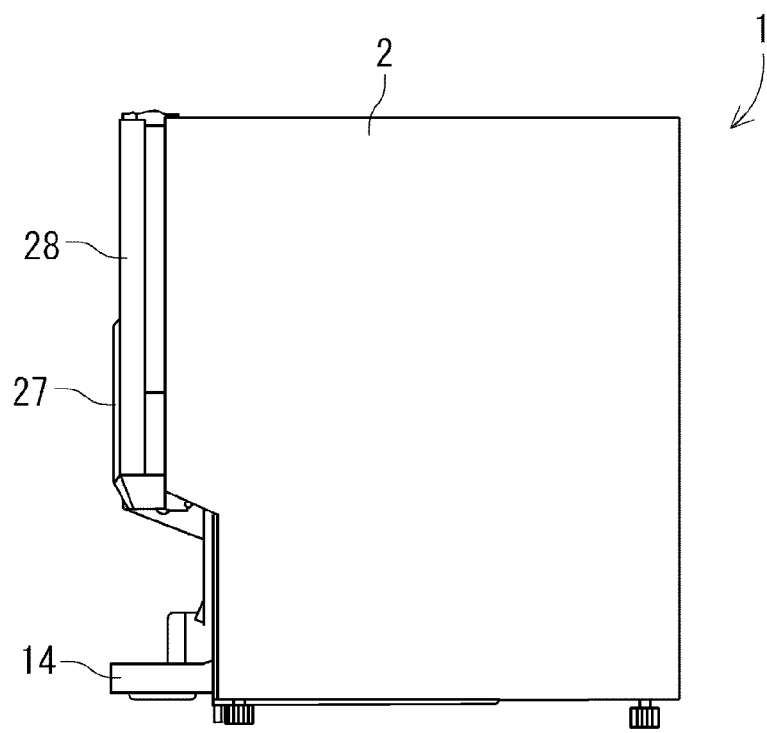
FIG. 2 is a side view of the main body of the beverage dispenser.
Figure 3:
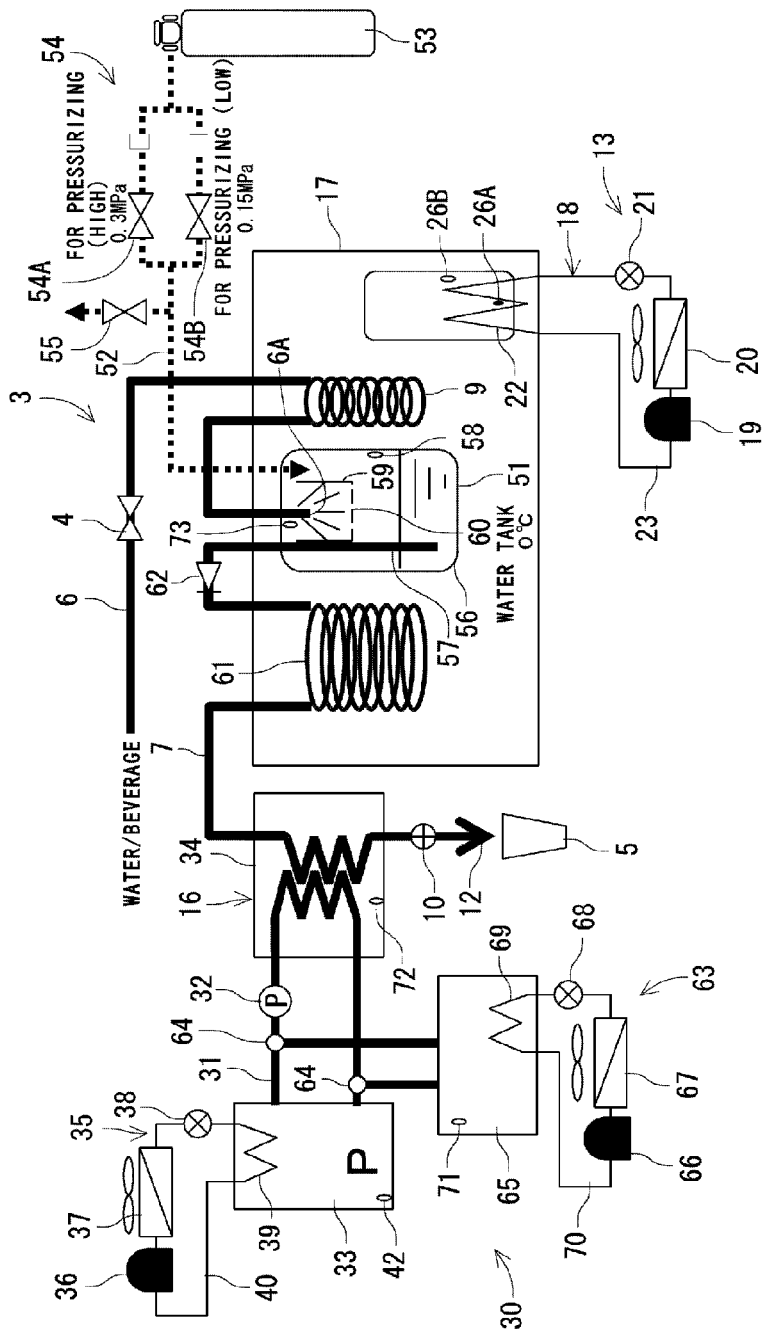
FIG. 3 is a schematic constitution diagram of a beverage dispenser.

First, the beverage dispenser 1 will be described in detail with reference to FIGS. 1 to 3. FIG. 1 is a front view of a main body 2 of the beverage dispenser 1 in which the present invention is utilized, FIG. 2 is a side view of the main body 2 of the beverage dispenser 1, and FIG. 3 is a schematic constitution diagram of the beverage dispenser 1.

The beverage dispenser 1 of the embodiment has a beverage supply unit 3 includes a beverage tank to store beverage ingredients formed by regulating beforehand the concentration of a raw material to be diluted, for example, a syrup (or the material to be diluted as a powder-like material to be diluted with a liquid for dissolution) which is a sugar liquid material into a concentration suitable for serving a targeted beverage by use of diluting water, the beverage tank being arranged in the vicinity of the main body 2; a beverage cooling coil 9 disposed in the main body 2; a carbonator 51; a heat exchanger 16 for supercooling the beverage; a beverage electromagnetic valve 10 and the like. It is to be noted that the beverage tank is connected to the beverage cooling coil 9 via a beverage supply line 6 having a part constituting the beverage cooling coil 9, and a beverage supply regulation valve 4 is interposed along the beverage supply line 6.

At the front surface of an openable/closable door 28 of the main body 2, an operating section 27 is disposed which operates the supply of beverage from the beverage supply unit 3 and which is provided with operation buttons for selecting a beverage supply amount or a beverage supply method for each beverage to be supplied from the beverage supply unit 3. The operating section 27 is connected to a control device C described later in detail.

Moreover, a nozzle 12 (shown in FIG. 3) for discharging the beverage from the beverage supply unit 3 is provided at the lower rear portion of the openable/closable door 28, and a table 14 is provided under the nozzle 12. On the table 14, a cup 5 can be arranged as a container for receiving the beverage discharged from a beverage supply circuit 7 described later via the nozzle 12. It is to be noted that in the present embodiment, the cup is described as the container, but this is not restrictive. For example, glass, dish or bucket may be used as long as the beverage can be received.

The beverage to be supplied in the present invention is a carbonated beverage, and hence the end of the beverage supply line 6 on an outlet side is connected to the carbonator 51 for manufacturing the carbonated beverage. This carbonator 51 is connected to a carbonic acid gas cylinder 53 which supplies a carbonic acid gas pressurized via a gas supply line 52. A gas regulator 54 including a plurality of pressure reduction valves, that is, two pressure reduction valves 54A (a second supply pressure, a high pressure), 54B (a first supply pressure, a low pressure) in the present embodiment is interposed along the gas supply line 52.

The gas regulator 54 is means for changing the supply pressure of the pressurized carbonic acid gas supplied from the carbonic acid gas cylinder 53 with respect to the carbonator 51, and the regulator constitutes a carbonic acid gas source in the present invention. It is to be noted that the carbonic acid gas cylinder 53 is distributed on the market, and is usually separately connected to the beverage dispenser 1 in an installation place. However, the carbonic acid gas cylinder 53 supplies the pressurized carbonic acid gas to the carbonator 51 via the gas regulator 54, and the cylinder may constitutes the carbonic acid gas source together with the gas regulator 54.

In consequence, the carbonic acid gas is supplied from the carbonic acid gas cylinder 53 to the carbonator 51 so that the supply pressure can be changed. It is to be noted that in the present embodiment, the pressure (first and second supply pressures) for the supply from the carbonic acid gas cylinder 53 to the carbonator 51 can be changed by switching two pressure reduction valves 54A, 54B, but this is not restrictive. The supply pressure may be changed by a plurality of types of pressure reduction valves or a pressure reduction valve capable of adjusting the pressure in a stepless manner.

Moreover, an exhaust valve 55 positioned on the downstream side of the gas regulator 54 so as to discharge the carbonic acid gas from the carbonator 51 provided on the downstream side is interposed along this gas supply line 52.

The carbonator 51 is constituted of a carbonator tank 56, and is connected to the gas supply line 52 for introducing the carbonic acid gas into the tank 56. A siphon tube 57 which extends upwardly from the lower part of the tank 56 so as to derive the carbonated beverage manufactured in the tank 56 is provided so as to communicate with the inside of the tank 56. There is also provided a water level sensor 58 for detecting the level of the carbonated beverage manufactured in the tank 56. A pressure sensor 73 for detecting the pressure in the carbonator 51 is further provided. It is to be noted that the siphon tube 57 constitutes a part of the beverage supply circuit 7 described later.

The outlet-side end of the beverage supply line 6 passes through the upper surface of the tank 56 to extend into the tank 56, and the tip of the line is provided with a nozzle portion 6A having spray nozzles or small holes. In consequence, the beverage supplied from the beverage supply line 6 via the nozzle portion 6A is sprayed or jetted.

In the upper part of the tank 56, a container 59 is provided into which the outlet end of the beverage supply line 6 is inserted from above and which can communicate with the inside of the tank 56, whereby the container can be filled with the carbonic acid gas. Then, the side surface and bottom surface of this container 59 are provided with a plurality of outflow holes 60 from which the carbonated beverage formed in the container is discharged.

The beverage cooling coil 9 cools the beverage discharged from the beverage tank to a temperature around an ice point. In the present embodiment, the beverage cooling coil 9, the carbonator 51 and further a heat exchanger 61 for re-cooling described later in detail are provided in an heat exchange manner in the same water tank 17 constituting a primary cooling device (constituting cooling means) 13.

That is, the primary cooling device 13 includes the water tank 17 to receive cooling water and a refrigerant circuit 18 which cools the cooling water received in the water tank 17 and which attaches ice of a predetermined ratio of the cooling water to a cooler 22. The refrigerant circuit 18 is constituted by connecting, annularly via a refrigerant pipe 23, a compressor 19 arranged in the main body 2, a condenser 20, an expansion valve 21 as pressure reduction means and the cooler 22 arranged so as to perform the heat exchange between the cooler and the cooling water received in the water tank 17.

Moreover, in the water tank 17, a stirring propeller (not shown) is provided which is driven by a stirring motor to stir the cooling water received in the water tank. Moreover, the water tank includes a first ice sensor 26A including a pair of conductors positioned in the cooler 22, and a second ice sensor 26B including a pair of conductors positioned outside the cooler 22. These ice sensors 26A, 26B output an ice detection signal, when the ice is interposed between the conductors and a resistance value is not less than a predetermined value.

On the other hand, the beverage supply circuit 7 (in actual, the siphon tube 57 constituting a part of the circuit 7) connected to the carbonator 51 is connected to the heat exchanger 61 for re-cooling which is positioned between the carbonator 51 and the heat exchanger 16 for supercooling described later and which constitutes a part of the beverage supply circuit 7.

In the present embodiment, the heat exchanger 61 for re-cooling is constituted of a cooling coil having a predetermined capacity (e.g., an amount to be supplied by at least the present device for one cup, a pipe length of about 10 m in the present embodiment), and a check valve (a valve device) 62 in which a direction from the carbonator 51 to the heat exchanger 61 for re-cooling is a forward direction is provided along the beverage supply circuit 7 between the heat exchanger 61 for re-cooling and the carbonator 51. It is to be noted that in the present embodiment, the heat exchanger 61 for re-cooling is provided, so that the check valve 62 is provided in the beverage supply circuit 7 positioned between the heat exchanger 61 and the carbonator 51, but this is not restrictive. The check valve 62 may be provided between the carbonator 51 and the portion of the beverage supply circuit 7 cooled by the heat exchanger 16 for supercooling. Moreover, in the present embodiment, the check valve 62 is employed as the valve device, but this is not restrictive, and a valve device controlled to open or close by the control device C may be used.

On the other hand, the beverage supply circuit 7 on the downstream side of the heat exchanger 61 for re-cooling is provided with the heat exchanger 16 for supercooling the beverage. This heat exchanger 16 for supercooling allows a secondary cooling device 30 (cooling means) to cool the carbonated beverage at a supercooling temperature which is a solidifying point or less. In the present embodiment, the heat exchanger is constituted with a double pipe. The double pipe is surrounded with an insulating material 34 or the like and constituted so that cold does not easily leak outwards.

Moreover, it is constituted that the beverage circulated through the beverage cooling coil 9, the carbonator 51 and the heat exchanger 61 for re-cooling flows into an inner pipe of this double pipe. It is to be noted that in the present embodiment, the inner pipe of the double pipe has such a capacity as to be filled with about one cup of the beverage in terms of the cup 5, for example, about 200 cc of beverage. Moreover, this double pipe is provided with a temperature sensor 72 which detects a temperature in the inner pipe.

In the present embodiment, the secondary cooling device 30 includes an anti-freezing liquid circuit 31 through which an anti-freezing liquid (brine, for example) is circulated; a first refrigerant circuit 35 which cools the anti-freezing liquid in the anti-freezing liquid circuit 31 at the supercooling temperature which is the solidifying point or less of the carbonated beverage, for example, −10 degrees centigrade; and a second refrigerant circuit 63 which cools the beverage to a predetermined cold reserving temperature higher than the solidifying point of the carbonated beverage as much as a predetermined temperature (e.g., 1 to 3 degrees centigrade), for example, −1 degrees centigrade. The anti-freezing liquid circuit 31 is provided with switch valves 64, 64 for allowing the control device C to selectively switch whether anti-freezing liquid cooled by the first refrigerant circuit 35 flows into the heat exchanger 16 for supercooling or anti-freezing liquid cooled by the second refrigerant circuit 63 flows into the heat exchanger 16 for supercooling.

The anti-freezing liquid circuit 31 is constituted by connecting an anti-freezing liquid circulation pump 32, the heat exchanger 16 for supercooling, an anti-freezing liquid tank 33 for supercooling and an anti-freezing liquid tank 65 for cold reserving. In the anti-freezing liquid circuit 31, the switch valves 64, 64 are interposed, and the switch valves 64, 64 are switched, whereby a circuit (a circuit for supercooling) including the anti-freezing liquid circulation pump 32, the heat exchanger 16 for supercooling and the anti-freezing liquid tank 33 for supercooling, and a circuit (a circuit for cold reserving) including the anti-freezing liquid circulation pump 32, the heat exchanger 16 for supercooling and the anti-freezing liquid tank 65 for cold reserving can be constituted. The anti-freezing liquid circuit 31 is filled with a predetermined amount of the anti-freezing liquid.

The present embodiment is constituted so that the anti-freezing liquid flowing through the anti-freezing liquid circuit 31 flows between an outer pipe and the inner pipe of the double pipe constituting the heat exchanger 16 for supercooling. Further in the present embodiment, the pipes are connected so that the anti-freezing liquid is circulated in such a direction as to be opposite to a circulating direction of the beverage. In consequence, the anti-freezing liquid flows into the heat exchanger 16 for supercooling from the downstream side of the beverage supply circuit 7, and is discharged from the heat exchanger 16 on an upstream side of the beverage supply circuit 7.

The anti-freezing liquid in the anti-freezing liquid tank 65 for supercooling is cooled at a supercooling temperature of the solidifying point or less of the carbonated beverage by the second refrigerant circuit 35. This refrigerant circuit 35 is constituted by annularly connecting, via a refrigerant pipe 40, a compressor 36 arranged in the main body 2, a condenser 37, an expansion valve 38 as pressure reduction means and a cooler 39 disposed so as to perform heat exchange between the cooler and the anti-freezing liquid of the anti-freezing liquid tank 33. It is to be noted that in the present embodiment, a four-way valve 41 (shown in FIG. 4 only) capable of changing a channel of a refrigerant received in the refrigerant circuit 35 is disposed so as to allow the refrigerant at a high temperature to flow into the cooler 39.

Moreover, in the anti-freezing liquid tank 33 for supercooling, a temperature sensor 42 is provided which detects the temperature of the anti-freezing liquid stored in the tank 33.

The anti-freezing liquid in the anti-freezing liquid tank 65 for cold reserving is cooled to a temperature higher than the solidifying point of the carbonated beverage as much as a predetermined temperature by the second refrigerant circuit 63. This refrigerant circuit 63 is constituted by connecting, annularly via a refrigerant pipe 70, a compressor 66 arranged in the main body 2, a condenser 67, an expansion valve 68 as pressure reduction means and a cooler 69 disposed so as to perform heat exchange between the cooler and the anti-freezing liquid of the anti-freezing liquid tank 65.

Moreover, a temperature sensor 71 for detecting the temperature of the anti-freezing liquid stored in the tank 65 is provided in the anti-freezing liquid tank 65 for cold reserving.

It is to be noted that FIG. 3 shows only one line of the beverage supply line 6 including the beverage supply regulation valve 4, the beverage cooling coil 9 and the carbonator 51, and only one line of the beverage supply circuit 7 including the carbonator 51, the heat exchanger 61 for re-cooling, the heat exchanger 16 for supercooling and the beverage electromagnetic valve 10, respectively. However, this is not restrictive, and the beverage supply line 6 and the beverage supply circuit 7 are provided for each type of beverage provided at the operating section 27. It is to be noted that in this case, the water tank 17 constituting the primary cooling device 13 is used in cooling the beverage cooling coils 9, the carbonator 51 and the heat exchanger 61 for re-cooling of the circuits. The anti-freezing liquid tank 33 constituting the secondary cooling device 30 and the anti-freezing liquid tank 65 for cold reserving may similarly be used in cooling the beverage supply circuits 7. However, it is preferable that the anti-freezing liquid circuit 31 is disposed for each of the supercooling heat exchangers 16 of the beverage supply circuits 7.

Figure 4:
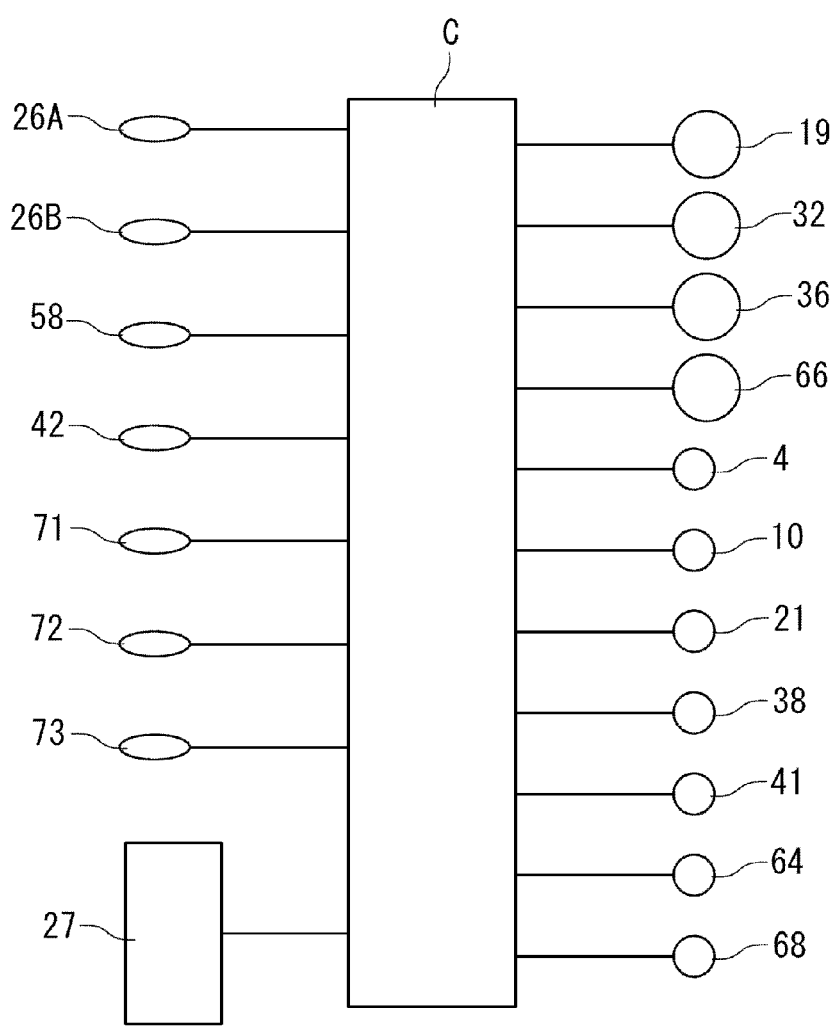
FIG. 4 is an electric block diagram of a control device.

Next, the control device C will be described with reference to the electric block diagram of FIG. 4. The control device C includes a microcomputer for general use, and is connected to the operating section 27, the first and second ice sensors 26A, 26B, the water level sensor 58, the temperature sensors 42, 71 and 72 and the pressure sensor 73 on an input side. The control device on an output side is connected to the beverage supply regulation valves 4; the beverage electromagnetic valves 10; the compressor 19 and the expansion valve 21 constituting the primary cooling device 13; the anti-freezing liquid circulation pump 32 and the switch valves 64, 64 constituting the secondary cooling device 30; the compressor 36, expansion valve 38 and four-way valve 41 constituting the first refrigerant circuit 35; and the compressor 66 and the expansion valve 68 constituting the second refrigerant circuit 63.

Figure 5:
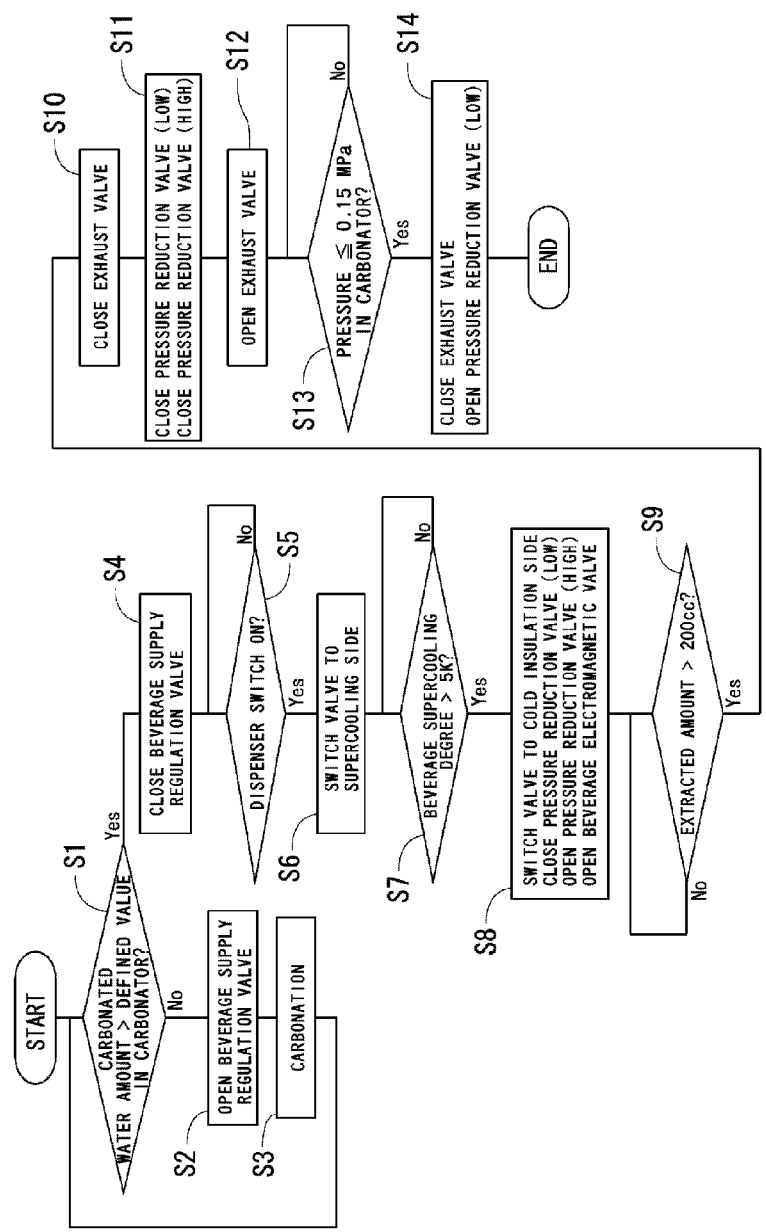
FIG. 5 is a flow chart.
Figure 6:
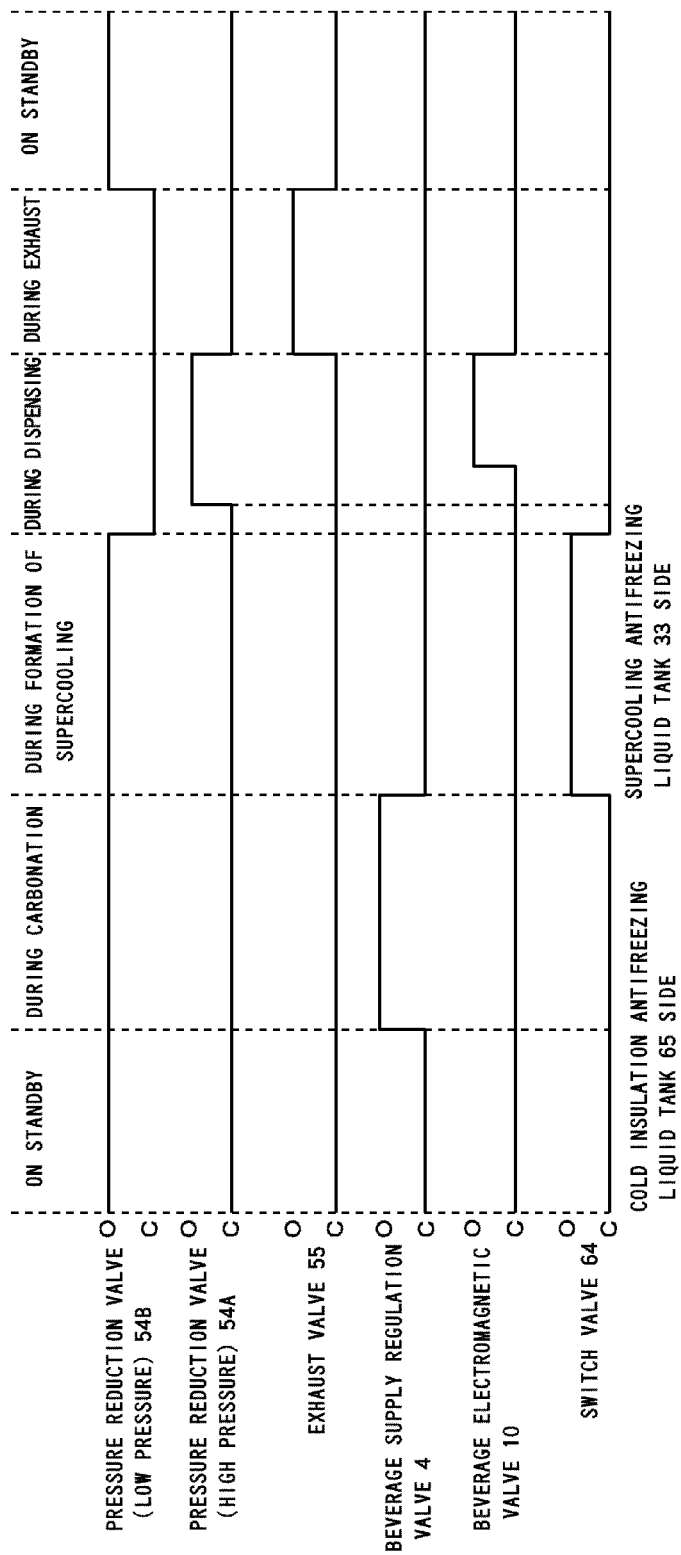
FIG. 6 is a timing diagram of valve devices.
Figure 7:
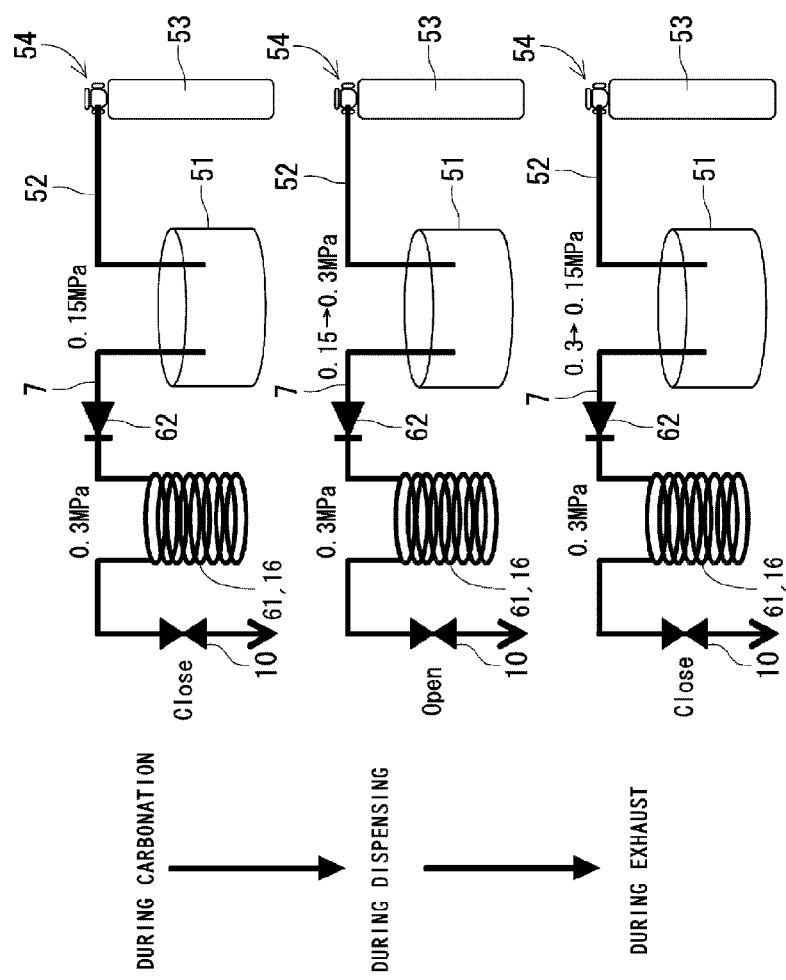
FIG. 7 is a pressurizing pressure explanatory view.

The operation of the beverage dispenser 1 having the above constitution will be described with reference to a flow chart of FIG. 5, a valve device timing chart of FIG. 6 and a pressurizing pressure explanatory view of FIG. 7.

(1) Preparation (Cooling) for Beverage Supply

First, the control device C achieves a beverage supply standby state, cools the cooling water in the water tank 17 of the primary cooling device 13, cools the anti-freezing liquid in the supercooling anti-freezing liquid tank 33 of the secondary cooling device 30 and the anti-freezing liquid tank 65 for cold reserving, opens the beverage supply regulation valves 4 and the beverage electromagnetic valves 10 and allows the beverage to flow into the beverage supply lines 4, the carbonators 51 and the beverage supply circuits 7.

To cool the cooling water in the water tank 17, first the control device C operates the compressor 19 and the like of the primary cooling device 13, and allows the cooler 22 to perform a cooling function. In consequence, the refrigerant pipe constituting the cooler 22 cools the cooling water in the water tank 17, and further forms ice I on the surface of the cooler 22. Moreover, it is judged based on the ice detection signals of the ice sensors 26A, 26B whether or not the ice sufficiently covers the cooling water stored in the water tank 17. Based on this judgment, the operations of the compressor 19 and the like of the primary cooling device 13 are controlled. Therefore, the beverage cooling coil 9, carbonator 51 and heat exchanger 61 for re-cooling immersed into the cooling water stored in the water tank 17 are cooled to a temperature around the ice point, and the beverage circulated through these components is also cooled to the temperature around the ice point.

To cool the anti-freezing liquid in the anti-freezing liquid tank 33 for supercooling, first the control device C operates the compressor 36 and the like constituting the first refrigerant circuit 35 of the secondary cooling device 30, and allows the cooler 39 to perform the cooling function. In consequence, the anti-freezing liquid in the anti-freezing liquid tank 33 for supercooling is cooled. Then, based on the detected temperature of the temperature sensor 42, the operations of the compressor 36 and the like of the secondary cooling device 30 are controlled so that the anti-freezing liquid in the anti-freezing liquid tank 33 for supercooling is cooled at a predetermined cooling temperature of about −10 degrees centigrade in the present embodiment. Therefore, the anti-freezing liquid in the anti-freezing liquid tank 33 for supercooling is constantly cooled at the supercooling temperature of about −10 degrees centigrade.

To cool the anti-freezing liquid in the anti-freezing liquid tank 65 for cold reserving, first the control device C operates the compressor 66 and the like constituting the second refrigerant circuit 63 of the secondary cooling device 30, and allows the cooler 69 to perform the cooling function. In consequence, the anti-freezing liquid in the anti-freezing liquid tank 65 for cold reserving is cooled. Then, based on the detected temperature of the temperature sensor 71, the operations of the compressor 66 and the like of the secondary cooling device 30 are controlled so that the anti-freezing liquid in the anti-freezing liquid tank 65 for cold reserving is cooled at a predetermined cooling temperature of about −1 degrees centigrade in the present embodiment. Therefore, the anti-freezing liquid in the anti-freezing liquid tank 65 for cold reserving is constantly cooled to the cold reserving temperature of about −1 degrees centigrade.

It is to be noted that on standby for beverage serving, the control device C switches the switch valve 64 provided in the anti-freezing liquid circuit 31 to the circuit for cold reserving, and operates the anti-freezing liquid circulation pump 32, whereby the heat exchanger 16 for supercooling is maintained at the predetermined cold reserving temperature which is 1 to 3 degrees centigrade higher than the solidifying point of the carbonated beverage, for example, −1 degrees centigrade in the present embodiment.

(2) Preparation for Beverage Supply (Carbonation)

While a cooling operation is performed as described above, the control device C executes manufacturing (carbonation) of the carbonated beverage in the carbonator 51. That is, in step S1, the control device C judges whether or not the beverage in the carbonator 51 detected by the water level sensor 58 has a predetermined level. When the predetermined level is not reached, the processing advances to step S2. The beverage supply regulation valve 4 is opened in the step S2 to execute the carbonation in step S3.

Specifically, as described later in detail, in the previous beverage supply operation, the pressure reduction valve (the first supply pressure, the low pressure) 54B is opened to supply the carbonic acid gas from the carbonic acid gas cylinder 53 to the tank 56 of the carbonator 51, and the inside of the tank is adjusted into a predetermined pressure of 0.15 MPa in the present embodiment. The beverage supply regulation valve 4 is opened in this state as described above, whereby the beverage ingredients supplied from the beverage supply line 6 are sprayed or jetted from the nozzle portion 6A opened in the tank 56.

In consequence, the sprayed or jetted beverage is mixed with the carbonic acid gas with which the tank 56 has been filled, and the carbonic acid gas is dissolved in the beverage. At this time, the beverage is sprayed or jetted into the container 59, so that the beverage is circulated through the container 59. In this process, the carbonic acid gas is sufficiently dissolved in the beverage, and the saturated carbonated beverage is manufactured with the pressure (the first supply pressure).

Then, the beverage (the beverage subjected to the carbonation, the carbonated beverage) in which the carbonic acid gas is dissolved in the container 59 is discharged from the outflow holes 60 formed in the side surface of the lower part of the container 59 and the bottom surface of the container, and received in the tank 56. In consequence, in the tank 56, the carbonated beverage having a predetermined volume of high-pressure gas is stored.

Afterward, the control device C returns from the step S3 to the step S1. When the water level sensor 58 detects that the level of the carbonated beverage in the tank 56 becomes a predetermined level, the control device C advances to step S4 to close the beverage supply regulation valve 4. In consequence, the carbonation is ended.

(3) Standby for Beverage Serving

Here, the carbonator 51 and the beverage cooling coil 9 are arranged in the water tank 17 cooled by the primary cooling device 13, so that the beverage ingredients for use in the carbonation and the carbonated beverage manufactured by the carbonator 51 are cooled at a predetermined cooling temperature around the ice point in the present embodiment.

The above carbonation ends, and the cooling water in the water tank 17 is cooled to the temperature around the ice point. After it is detected that the anti-freezing liquid in the anti-freezing liquid tanks 33, 65 has been cooled at the predetermined cooling temperature, the control device C obtains a state in which the carbonated beverage can be dispensed, that is, a state in which the operation buttons provided in the operating section 27 to supply the beverages can be operated.

It is to be noted that in this state, when the beverage is supplied for the first time, the heat exchanger 61 for re-cooling and the inner pipe of the heat exchanger 16 for supercooling are not filled with the carbonated beverage. Therefore, the control device C closes the pressure reduction valve (the first supply pressure, the low pressure) 54B, and the pressure reduction valve (the second supply pressure, the high pressure) 54A and the beverage electromagnetic valve 10 are opened for a predetermined time, whereby the beverage supply circuit 7 from the carbonator 51 to the beverage electromagnetic valve 10 is filled with the carbonated beverage. At this time, to feed the beverage, the carbonic acid gas having a predetermined high pressure (the second supply pressure) of 0.3 MPa here is used, so that the beverage supply circuit 7 from the carbonator 51 to the beverage electromagnetic valve 10 has a high pressure (0.3 MPa here). Therefore, when the beverage electromagnetic valve 10 is closed, the check valve 62 interposed between the carbonator 51 and the heat exchanger 61 for re-cooling maintains a predetermined high pressure (0.3 MPa) in the beverage supply circuit 7 from the check valve 62 to the beverage electromagnetic valve 10 (in the heat exchanger 61 for re-cooling and the heat exchanger 16 for supercooling) without any back flow to the carbonator 51.

Moreover, the carbonated beverage carbonated and activated in the carbonator 51 is again cooled in the heat exchanger 61 for re-cooling arranged in the water tank 17 cooled to the temperature around the ice point by the primary cooling device 13. At this time, the heat exchanger 61 for re-cooling is constituted of the beverage cooling coil having a predetermined capacity, that is, a pipe length of about 10 m in the present embodiment, so that in a process in which the carbonated beverage is circulated through the heat exchanger 61, the activated carbonated beverage is maintained in a stabilized state, that is, a state in which any bubble is not easily generated in the carbonated beverage. In consequence, a disadvantage that the ice nucleus is generated in a process of forming the carbonated beverage having the supercooled state in the subsequent stage can more efficiently be avoided.

Furthermore, the carbonated beverage circulated through the heat exchanger 61 for re-cooling flows into the inner pipe of the double pipe constituting the heat exchanger 16 for supercooling. Here, the anti-freezing liquid having the cold reserving temperature (−1 degrees centigrade in the present embodiment) which is 1 to 3 degrees centigrade higher than the solidifying point of the carbonated beverage as described above is circulated between the inner pipe of the double pipe constituting the heat exchanger 16 for supercooling and the outer pipe thereof. Therefore, the carbonated beverage in the heat exchanger 16 for supercooling is maintained at such a cold reserving temperature.

Here, as described above, the heat exchanger 61 for re-cooling and the inner pipe of the heat exchanger 16 for supercooling are maintained at a pressure (a predetermined high pressure of 0.3 MPa here) higher than a carbonation pressure (a predetermined low pressure of 0.15 MPa here). Therefore, the carbonated beverage formed in the saturated state by the carbonator 51 is pressurized and hence brought into an unsaturated state, whereby a disadvantage that bubble is generated in the heat exchanger 61 for re-cooling and the heat exchanger 16 for supercooling can effectively be inhibited.

(4) Beverage Supply

In such a state, the control device C detects, in step S5, whether or not a dispenser button has been operated. When any operation button provided in the operating section 27 is operated, the control device advances to step S6. In the step S6, the switch valve 64 which has been switched to the cold reserving circuit is switched to the side of the circuit for supercooling.

In consequence, the anti-freezing liquid at a temperature which is lower than the solidifying point of the carbonated beverage as much as a predetermined temperature in the anti-freezing liquid tank 33 for supercooling, for example, about −10 degrees centigrade here flows between the inner pipe and the outer pipe of the double pipe constituting the heat exchanger 16 for supercooling. In consequence, the carbonated beverage in the inner pipe of the double pipe performs the heat exchange between the beverage and the anti-freezing liquid at about −10 degrees centigrade, and is cooled at the supercooling temperature of the solidifying point or less, for example, −10 degrees centigrade here.

In step S7, the control device C judges whether or not the temperature sensor 72 provided in the heat exchanger 16 for supercooling detects a temperature which is 5 degrees centigrade lower than the solidifying point of the carbonated beverage. When the temperature is detected, the control device advances to step S8.

In the process of cooling the carbonated beverage at the supercooling temperature, a pressure higher than that during the carbonation is applied to the carbonated beverage in the heat exchanger 16 for supercooling as described above, whereby the beverage is brought into the unsaturated state. The disadvantage that the bubble is generated in the heat exchanger 16 for supercooling can effectively be suppressed. In consequence, the disadvantage that the bubble forms the ice nucleus can be suppressed, and the carbonated beverage can be cooled into the supercooled state at the solidifying point or less of the beverage with a high probability.

Then, after the control device C judges that the carbonated beverage in the heat exchanger 16 for supercooling is cooled at the predetermined supercooling temperature, in the step S8, the control device switches the switch valve 64 of the anti-freezing liquid circuit 31 from the supercooling anti-freezing liquid tank 33 side to the cold reserving anti-freezing liquid tank 65 side, and closes the pressure reduction valve (the low pressure) 54B. The control device opens the pressure reduction valve (the high pressure) 54A, and opens the beverage electromagnetic valve 10 after a delay of predetermined time.

In consequence, owing to impact in a case where the carbonated beverage brought into the supercooled state in the heat exchanger 16 for supercooling is discharged from the nozzle 12 in a container such as the cup, the supercooled state is released, and the carbonated beverage can immediately be phase-changed to the ice. Therefore, the beverage can be served in the finally served state which is the sherbet state.

At this time, the beverage electromagnetic valve 10 is opened, whereby the pressure reduction valve (the high pressure) 54A is opened. In consequence, the pressurized carbonic acid gas supplied from the carbonic acid gas cylinder 53 is set to a predetermined high supply pressure (0.3 MPa in this case) by the pressure reduction valve 54A. Therefore, the pressure in the gas supply line 52, the carbonator 51 and the beverage supply circuit 7 (the heat exchanger 61 for re-cooling, the heat exchanger 16 for supercooling) is also set to the high pressure. Simultaneously, the carbonated beverage in the heat exchanger 61 for re-cooling is successively pushed out into the heat exchanger 16 for supercooling.

Therefore, the carbonated beverage stored in the carbonator 51 flows into the heat exchanger 61 for re-cooling, and performs the heat exchange between the beverage and the cooling water of the water tank 17, whereby while the beverage is cooled to the ice point or so, the carbonated beverage activated in the carbonator 51 can be stabilized as described above. At this time, the carbonated beverage flows from the carbonator 51 into the heat exchanger 61 for re-cooling to push out, into the heat exchanger 16 for supercooling, the carbonated beverage with which the heat exchanger 61 for re-cooling has been filled. The carbonated beverage is on standby for the next serving.

(5) Preparation for Next Beverage Serving

Then, in step S9, the control device C judges whether or not the amount of the carbonated beverage to be extracted from the nozzle 12 is larger than 200 cc. When the amount is 200 cc, the control device advances to step S10. In the step S10, the control device C closes the beverage electromagnetic valve 10, and then shifts to step S11 to close the pressure reduction valves 54A, 54B. Afterward, the control device advances to step S12 to open the exhaust valve 55.

In this state, between the check valve 62 of the beverage supply circuit 7 and the beverage electromagnetic valve 10, the check valve 62 having a direction from the carbonator 51 to the heat exchanger 61 for re-cooling as a forward direction and the beverage electromagnetic valve 10 are closed. The carbonated beverage between the valves is maintained in a state in which the beverage is pressurized under a high beverage feeding pressure (the second supply pressure) of 0.3 MPa here.

Therefore, in a simple structure, the carbonated beverage in the beverage supply circuit 7 between the check valve 62 and the beverage electromagnetic valve 10 is maintained at a predetermined high pressure without any back flow to the carbonator 51 side, whereby the beverage can be maintained in the unsaturated state. In consequence, it is possible to suppress the disadvantage that in the beverage supply circuit 7 including the heat exchanger 16 for supercooling, the bubble is generated in the carbonated beverage, and forms the ice nucleus in a process of cooling the beverage to the temperature of the solidifying point or less of the beverage.

On the other hand, the exhaust valve 55 is opened, whereby the pressure in the space of the beverage supply circuit 7 on the upstream side of the check valve 62 and the carbonator 51 gradually decreases.

In step S13, the control device judges whether or not the pressure detected by the pressure sensor 73 provided in the carbonator 51 is 0.15 MPa or less. When the pressure is 0.15

MPa, the control device shifts to step S14 to close the exhaust valve 55 and open the pressure reduction valve 54B. In consequence, the beverage between the gas supply line 52 and the check valve 62 via the carbonator 51 is maintained at a predetermined low pressure of 0.15 MPa suitable for manufacturing the carbonated beverage here. In consequence, the pressure in the carbonator 51 can easily be adjusted into a pressure corresponding to the defined gas volume value. Therefore, the carbonation can efficiently be executed based on the detection of the water level sensor 58. It is to be noted that in the present embodiment, the check valve 62 is employed, so that unlike the electromagnetic valve or the like, any electric power is not necessary, and power saving can be realized. Moreover, a disadvantage that the beverage is warmed by the electromagnetic valve can be prevented. Subsequently, when the preparation for the next beverage serving is completed and any operation button provided in the operating section 27 is operated again, as described above, the carbonated beverage having the supercooled state is discharged to the outside (in actual, a container such as the cup).

According to such a constitution, the beverage cooled to the temperature around the ice point in the water tank 17 of the primary cooling device 13, in actual, the manufactured carbonated beverage cooled in the beverage cooling coil 9, the carbonator 51 and the heat exchanger 61 for re-cooling performs the heat exchange between the beverage and the anti-freezing liquid cooled to the solidifying point or less of the beverage in the heat exchanger 16 for supercooling, whereby the carbonated beverage can efficiently be cooled into the supercooled state at the solidifying point or less in a short time.

Therefore, the supercooled state of the carbonated beverage discharged from the nozzle 12 is released owing to the impact during the injection of the beverage into the cup 5, and the beverage can immediately be phase-changed to the ice. The beverage can be served in the finally served state which is the sherbet state.

It is to be noted that in order to increase the amount of the ice of the carbonated beverage having the supercooled state released owing to the impact in a container such as the cup 5 is further increased, the cooling temperature in the heat exchanger 16, in actual, the cooling temperature of the anti-freezing liquid in the anti-freezing liquid tank 33 for supercooling may be set to a lower temperature.

In the present embodiment, in particular, the heat exchanger 16 for supercooling is constituted of the double pipe, so that while realizing the miniaturization of the device, a heat exchange property between the beverage flowing through the beverage supply circuit 7 and the anti-freezing liquid flowing through the anti-freezing liquid circuit 31 can be improved.

Moreover, the present embodiment is constituted so that the anti-freezing liquid flows through the anti-freezing liquid circuit 31 to cool the beverage flowing through the beverage supply circuit 7, so that the device can be miniaturized as compared with a case where a water tank containing the anti-freezing liquid is used.

It is to be noted that in the present embodiment, the heat exchanger 16 for supercooling the beverage is constituted with the double pipe, but the heat exchanger may be constituted of a plate type heat exchanger instead of this pipe.

Furthermore, the beverage and the anti-freezing liquid flow through the heat exchanger 16 for supercooling the beverage in a manner of counter flow. In consequence, it is possible to further improve the efficiency of the heat exchange between the beverage flowing through the beverage supply circuit 7 and the anti-freezing liquid flowing through the anti-freezing liquid circuit 31, and the improvement of a cooling performance can be realized.

Moreover, in this state, the control device C operates the switch valve 64 to switch the anti-freezing liquid circuit 31 from the supercooling anti-freezing liquid tank 33 side to the cold reserving anti-freezing liquid tank 65 side, whereby the anti-freezing liquid circulation pump 32 is operated.

In consequence, on standby for serving at a time other than a time when the carbonated beverage is served, in the anti-freezing liquid circuit 31, the anti-freezing liquid set to the predetermined cold reserving temperature higher than the solidifying point of the carbonated beverage is circulated through the heat exchanger 16 for supercooling, whereby it is not necessary to maintain the carbonated beverage in the supercooled state for a long time, and an ice nucleus generation probability can be decreased. Therefore, it is possible to prevent the clogging of the circuit due to the frozen carbonated beverage in the portion of the beverage supply circuit 7 constituting the heat exchanger 16 for supercooling.

Moreover, on standby for serving the carbonated beverage, the carbonated beverage is maintained at the predetermined cold reserving temperature higher than the solidifying point of the beverage, so that during the beverage serving, the carbonated beverage can efficiently be cooled into the supercooled state.

It is to be noted that if the supercooled state of the beverage in the beverage supercooling heat exchanger 16 is released owing to some influence, for example, the influence of a type of beverage, a difference between the solidifying point and the supercooling temperature, the material, shape or surface roughness of a member such as a beverage cooling pipe which directly comes in contact with the beverage or the like and the beverage is frozen in the beverage supercooling heat exchanger 16, the control device C executes thawing control.

During the thawing control, the control device C controls the four-way valve 41, and a high-temperature gas refrigerant discharged from the compressor 36 of the refrigerant circuit 35 of the secondary cooling device 30 is allowed to flow into the cooler 39 without flowing through the condenser 37 or the expansion valve 38. In consequence, when the high-temperature gas refrigerant flows into the cooler 39, the anti-freezing liquid of the anti-freezing liquid tank 33 for supercooling is heated, and the anti-freezing liquid circulation pump 32 is driven to circulate the heated anti-freezing liquid through the anti-freezing liquid circuit 31. Therefore, the beverage frozen in the beverage supply circuit 7 which performs the heat exchange between the beverage and the anti-freezing liquid of the anti-freezing liquid circuit 31 in the heat exchanger 16 for supercooling the beverage is heated. In consequence, the beverage in such a beverage supply circuit 7 is thawed.

Thus, the constitution to circulate the anti-freezing liquid is adopted in a limited circuit such as the anti-freezing liquid circuit 31, so that the temperature of the anti-freezing liquid can easily be controlled. Even in a case where the supercooled state of the beverage of the beverage supply circuit 7 which performs the heat exchange between the beverage and the anti-freezing liquid of the anti-freezing liquid circuit 31 is released to freeze the beverage, the frozen beverage can easily be thawed, and the clogging of the beverage supply circuit 7 can be released. In consequence, the supercooled beverage can appropriately and smoothly be supplied.

It is to be noted that, in the present embodiment, the hot gas of the refrigerant circuit 40 is used as the heating means of the beverage frozen in the beverage supply circuit 7 of the heat exchanger 16 for supercooling the beverage, but this is not restrictive. The heat exchanger 16 for supercooling the beverage may be provided with an electric heater or the like to thaw the frozen beverage.

Moreover, according to such an embodiment, in the heat exchanger 16 for supercooling the beverage, the anti-freezing liquid separately cooled by the coolers 39, 69 of the refrigerant circuit 40, 70 is circulated through the anti-freezing liquid circuit 31, and the heat exchange is performed between the anti-freezing liquid circuit 31 and the beverage supply circuit 7 to cool the beverage at the supercooling temperature or the cold reserving temperature. However, the present invention is not limited to the indirectly cooling method. The coolers 39, 69 may be provided at the heat exchanger 16 for supercooling the beverage to directly cool the beverage supply circuit 7 of the heat exchanger 16 for supercooling the beverage by the refrigerant circulated through the coolers 39, 69.

In such a case, if the beverage is frozen in the beverage supply circuit 7 of the heat exchanger 16 for supercooling the beverage, the high-temperature refrigerant is allowed to flow into the cooler 39 or 69, and the beverage is thawed.

It is to be noted that as described above, in the present embodiment, carbonated beverage is manufactured in the carbonator 51, but this is not restrictive. The carbonated beverage formed from the beginning is supplied into the heat exchanger 61 for re-cooling, and the supercooled beverage may be formed in the heat exchanger 16 for supercooling in the same manner as in the present embodiment.

REFERENCE SIGNS LIST

C control device
1 beverage dispenser
4 beverage supply regulation valve
5 cup (container or the like)
6 beverage supply line
7 beverage supply circuit
9 beverage cooling coil
10 beverage electromagnetic valve
12 nozzle
13 primary cooling device (cooling means)
16 heat exchanger for supercooling beverage
17 water tank
27 operating section
30 secondary cooling device (cooling means)
31 anti-freezing liquid circuit
32 anti-freezing liquid circulation pump
33 anti-freezing liquid tank for supercooling
35 first refrigerant circuit
51 carbonator
52 gas supply line
53 carbonic acid gas cylinder
54 gas regulator (carbonic acid gas source)
54A pressure reduction valve (high pressure)
54B pressure reduction valve (low pressure)
55 exhaust valve
58 water level sensor
61 heat exchanger for re-cooling
62 stop valve (valve device)
63 second refrigerant circuit
64 switch valve
65 anti-freezing liquid tank for cold reserving
71, 72 temperature sensor
73 pressure sensor

The invention claimed is:

1. A beverage dispenser, comprising:
a water tank comprising water therein;
a primary cooling device in communication with the water tank, wherein the primary cooling device is configured to cool the water with the water tank;
a carbonator disposed within the water tank, wherein the carbonator is configured to manufacture a carbonated beverage from carbonic acid gas and beverage ingredients;
a beverage supply circuit in communication with the carbonator, wherein the beverage supply circuit is configured to supply the carbonated beverage to a nozzle;
a supercooling heat exchanger in communication with the beverage supply circuit;
a secondary cooling device in communication with the supercooling heat exchanger, wherein the secondary cooling device is configured to cool the carbonated beverage flowing through the beverage supply circuit into a supercooled state at a temperature of a solidifying point or less;
a carbonic acid gas source;
a gas supply line in communication with the carbonic acid gas source and the carbonator;
a gas regulator disposed along the gas supply line between the carbonic acid gas source and the carbonator, wherein the gas regulator comprises:
a first pressure reduction valve configured to supply a first pressure; and
a second pressure reduction valve is parallel with the first pressure reduction valve, wherein the second pressure reduction valve is configured to supply a second pressure; and
an exhaust valve disposed along the gas supply line downstream of the gas regulator, wherein the beverage supply circuit is maintained at the second pressure after the carbonated beverage is served, and wherein a pressure in the carbonator is set to the first pressure when the carbonated beverage in the beverage supply circuit is brought into an unsaturated state.

2. The beverage dispenser of claim 1, further comprising:
a beverage supply line in communication with the carbonator;
a beverage supply regulation valve disposed along the beverage supply line; and
a beverage cooling coil disposed in the water tank along the beverage supply line downstream of the beverage regulation valve, wherein the beverage cooling coil is configured to cool the beverage ingredients to a temperature around an ice point.

3. The beverage dispenser of claim 1, wherein the first pressure is configured to manufacture the carbonated beverage from the carbonic acid gas and the beverage ingredients in the carbonator.

4. The beverage dispenser of claim 1, wherein the second pressure is higher than the first pressure to push out the carbonated beverage from the carbonator to the beverage supply circuit when the carbonated beverage is served.

5. The beverage dispenser of claim 1, wherein after the carbonated beverage is served, the exhaust valve is opened to decrease the pressure in the carbonator and a pressure from the carbonic acid gas source is set to the first pressure.

6. The beverage dispenser of claim 1, further comprising:
a check valve disposed along the beverage supply circuit between the carbonator and the supercooling heat exchanger;

a re-cooling heat exchanger disposed along the beverage supply circuit within the water tank between the carbonator and the supercooling heat exchanger, wherein the re-cooling heat exchanger is configured to cool the carbonated beverage to a temperature around an ice point; and an electromagnetic valve disposed along the beverage supply circuit downstream of the supercooling heat exchanger.

7. The beverage dispenser of claim 6, wherein the check valve and electromagnetic valve are configured to preserve the carbonated beverage in the beverage supply circuit between the check valve and the electromagnetic valve in an unsaturated state by maintaining a predetermined supply pressure without back flow to the carbonator after the carbonated beverage is dispensed.

8. The beverage dispenser of claim 1, wherein the secondary cooling device comprises:

an anti-freezing liquid circuit in communication with the supercooling heat exchanger;

an anti-freezing liquid flowing through the anti-freezing liquid circuit;

a supercooling anti-freezing liquid tank in communication with the anti-freezing liquid circuit;

a first refrigeration circuit in communication with the supercooling anti-freezing liquid tank;

a cold reserving anti-freezing liquid tank in communication with the anti-freezing liquid circuit;

a second refrigeration circuit in communication with the cold reserving anti-freezing liquid tank; and one or more switch valves disposed along the anti-freezing liquid circuit, wherein the one or more switch valves are configured to switch between the supercooling anti-freezing liquid tank and the cold reserving anti-freezing liquid tank.

9. The beverage dispenser of claim 8, wherein the supercooling anti-freezing liquid tank is configured to provide the anti-freezing liquid to the anti-freezing liquid circuit and the supercooling heat exchanger at a temperature of a solidifying point or less of the carbonated beverage for supercooling at a time when the carbonated beverage is served.

10. The beverage dispenser of claim 8, wherein the cold reserving anti-freezing liquid tank is configured to provide the anti-freezing liquid to the anti-freezing liquid circuit and the supercooling heat exchanger at a predetermined cold reserving temperature higher than the solidifying point of the carbonated beverage for supercooling at a time when the carbonated beverage is on standby for serving.

11. A beverage dispenser, comprising:

a water tank comprising water therein;

a primary cooling device in communication with the water tank, wherein the primary cooling device is configured to cool the water with the water tank;

a carbonator disposed within the water tank, wherein the carbonator is configured to manufacture a carbonated beverage from carbonic acid gas and beverage ingredients;

a beverage supply circuit in communication with the carbonator, wherein the beverage supply circuit is configured to supply the carbonated beverage to a nozzle;

a supercooling heat exchanger in communication with the beverage supply circuit;

a secondary cooling device in communication with the supercooling heat exchanger, wherein the secondary cooling device is configured to cool the carbonated beverage flowing through the beverage supply circuit into a supercooled state at a temperature of a solidifying point or less, wherein the secondary cooling device comprises:

an anti-freezing liquid circuit in communication with the supercooling heat exchanger;

an anti-freezing liquid flowing through the anti-freezing liquid circuit;

a supercooling anti-freezing liquid tank in communication with the anti-freezing liquid circuit;

a first refrigeration circuit in communication with the supercooling anti-freezing liquid tank;

a cold reserving anti-freezing liquid tank in communication with the anti-freezing liquid circuit;

a second refrigeration circuit in communication with the cold reserving anti-freezing liquid tank; and one or more switch valves disposed along the anti-freezing liquid circuit, wherein the one or more switch valves are configured to switch between the supercooling anti-freezing liquid tank and the cold reserving anti-freezing liquid tank.

* * * * *